United States Patent [19]

Takahashi et al.

[11] Patent Number: 4,928,179
[45] Date of Patent: May 22, 1990

[54] VIDEO CAMERA CAPABLE OF EFFECTING REMOTE CONTROL OPERATION

[75] Inventors: Kimihide Takahashi; Hidemi Sasaki; Yoshiaki Nakayama, all of Tokyo, Japan

[73] Assignee: Fuji Photo Film Co., Ltd., Kanagawa, Japan

[21] Appl. No.: 351,050

[22] Filed: May 12, 1989

[30] Foreign Application Priority Data

May 19, 1988 [JP] Japan ................... 63-120658

[51] Int. Cl.$^5$ .............................. H04N 7/18
[52] U.S. Cl. ................... 358/210; 358/108; 358/229
[58] Field of Search .............. 358/224, 210, 125, 109, 358/229, 108

[56] References Cited

U.S. PATENT DOCUMENTS 4,550,343 10/1985 Nakatani ........................ 358/224
4,757,388 7/1988 Someya et al. .................. 358/224

Primary Examiner—Jin F. Ng
Assistant Examiner—Stephen Brinich
Attorney, Agent, or Firm—Birch, Stewart, Kolasch & Birch

[57] ABSTRACT

A video camera includes a light receiving device to enable a remote control operation to be achieved and a tally lamp to indicate a state of operation of the camera to the operator. The light receiving device and the tally lamp are installed in a housing such that when travel members disposed in a lower portion of the housing travel on an annular rail arranged on the body of the camera, the light receiving device and the tally lamp are moved to change directions thereof with respect to the body. An operator causes light to enter the light receiving device from a desired direction so as to operate the camera and to recognize a state of the operation of the camera by visually checking the tally lamp.

8 Claims, 7 Drawing Sheets

VIDEO CAMERA CAPABLE OF EFFECTING REMOTE CONTROL OPERATION

BACKGROUND OF THE INVENTION

1. Field of the Invention

The present invention relates to a video camera, and in particular, to a video camera capable of confirming an operation of the camera during a remote control operation thereof.

2. Description of the Prior Art

For example, in a case where it is desired to effect a remote control operation of a video camera, there has been known a method in which a light receiving section for the remote control is disposed on the video camera such that an infrared ray irradiated from a light emitter according to a remote control operation is received by the light receiving section, thereby achieving an operation of the camera. Similarly, a light receiving section for the remote control may be disposed on a video tape recorder (VTR), with a camera integrated therewith so as to effect a remote control operation of the VTR or the camera. There has been a system in which such a remote control operation can be achieved from various directions with respect to the camera, namely, the remote control light receiving section can be positioned toward various directions, as described in the Japanese Patent Laid-Open Publication No. 16695/1988, for example.

In an apparatus to be operated through a remote control operation, the user takes a place apart from the apparatus and hence cannot confirm the operation thereof in any ordinary manner. For example, in a case where the operator instructs the start of a shooting operation by use of a remote control light emitter such that a light receiving section of a camera receives an infrared ray emitted from the light emitter so as to start the shooting operation, since the operator is apart from the camera, it is impossible for the operator to confirm whether or not the shooting operation of the camera has started.

To overcome this difficulty, there has been proposed a system in which a tally lamp is disposed on the camera such that, by turning the lamp on, for example, the shooting operation in process is notified to the operation initiating the remote control operation.

However, since such a tally lamp is arranged to be directed toward a front side of the apparatus, the operator can confirm the on/off state of the lamp only from the front side thereof. In consequence, when the remote control light receiving section is moved to face various directions for the remote control operation, since the operation of the apparatus cannot be confirmed as described above, there has been a disadvantage that the remote control operation cannot be easily achieved from directions other than that associated with the front side of the apparatus.

SUMMARY OF THE INVENTION

It is therefore an object of the present invention to provide a video camera in which the remote control operation can be effected from any direction with respect to the apparatus and the operation of the apparatus can also be confirmed, thereby removing the problems of the prior-art technology.

According to the present invention, a video camera capable of effecting a remote control operation includes a light receiving means for a remote control operation, display means for displaying an operation state of the camera to the operator during the remote control operation, and means for rotating the light receiving means and the display means at least in a horizontal direction with respect to a body of the camera wherein the directions respectively of the light receiving means and the display means can be changed by an operator depending on the direction from which the operator effects the operation.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, a description will be given in detail of an embodiment of a video camera according to the present invention.

Figure 1:
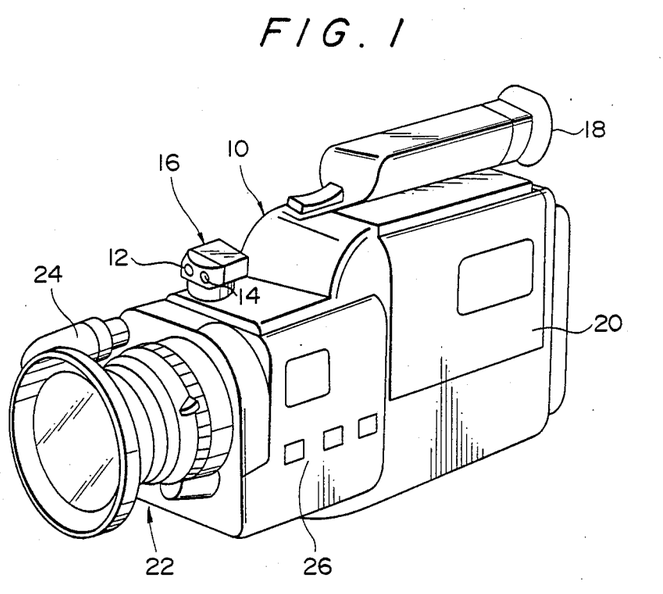
FIG. 1 is a perspective view showing an embodiment of video tape recorder (VTR), with a video camera integrated therewith, according to the present invention.

FIG. 1 shows an embodiment of a video camera in which the present invention is applied, the video camera having a VTR function, namely, a video camera with an integrated VTR.

In this embodiment, there are disposed on a body 10 a housing 16 in which a light receiving section 12 and a tally lamp 14 are arranged. The body 10 is provided with a VTR cabinet 20, and in the body, there are housed imaging means and various circuits related thereto. In a front surface of the body 10, an optical lens 22 and a microphone 24 are disposed; whereas on the side surface thereof, an operation button 26 is arranged; furthermore, an electronic viewfinder 18 is located on an upper portion of the body 10.

Figure 2:
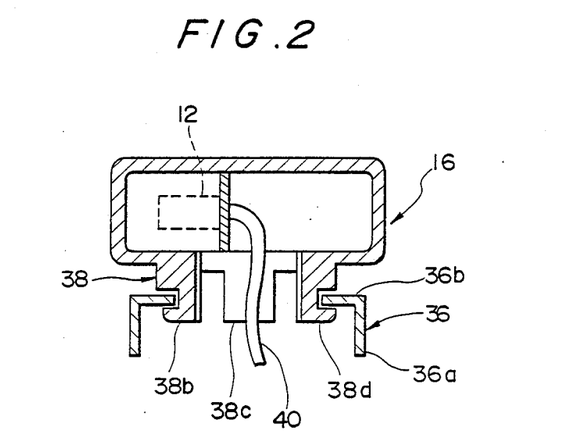
FIG. 2 is a cross-sectional view showing a housing section of FIG. 1.
Figure 3:
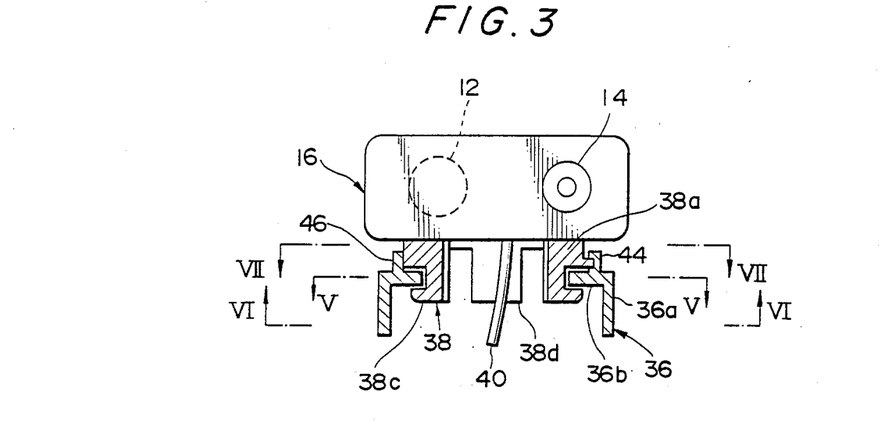
FIG. 3 is a cross-sectional view showing a portion of the housing section of FIG. 1.
Figure 4:
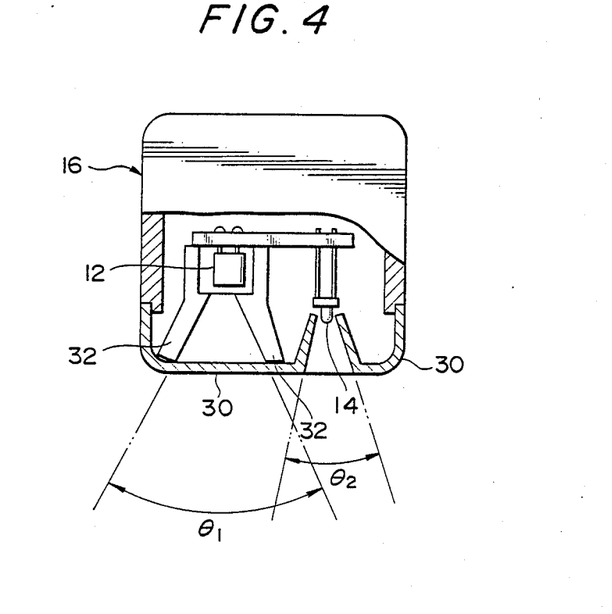
FIG. 4 is a plan view showing a portion of the housing section of FIG. 1.

FIGS. 2, 3, and 4 respectively show a cross-sectional view of the housing 16 of FIG. 1 viewed from the side surface, a partially cross-sectional view thereof viewed from the front side, and patially cross-sectional view thereof viewed from the upper side. As can be seen from these figures, the light receiver 12 and the tally lamp 14 are mounted on the housing 16 to direct the front side. The light receiver 12 receives an infrared ray generated from a remote control light emitter, not shown, in response to a remote control. In the front surface of the light receiver 12, there is arranged a visible light cut filter to prevent visible light from passing therethrough, as shown in FIG. 4. In addition, in front of the light receiver 12, there is disposed a light preventing member 32, which extends to the front side so as to become wider as the distance from the light receiver 12 increases. The light preventing member 32 is used to limit the range of an incident angle of the infrared light incident thereto.

The tally lamp 14 includes a light emitting diode (LED), which emits lights of two colors of red and green in this embodiment. In the front side of the tally lamp 14, there is disposed a visible light filter 30, which extends toward the front side so as to become wider as the distance from the tally lamp 14 increases, thereby limiting a direction of light emitted from the tally lamp 14.

An angle $\theta 1$ of the light incident to the light receive section 12 limited by the light preventing member 32 and an angle $\theta 2$ of the light radiated from the tally lamp 14 are desirably set to satisfy $\theta 1 \geqq \theta 2$. In this case, when a remote control light emitter is operated at a position where the light irradiated from the tally lamp 14 can be seen, the light from the remote control light emitter reaches the light receiver 12.

Figure 5:
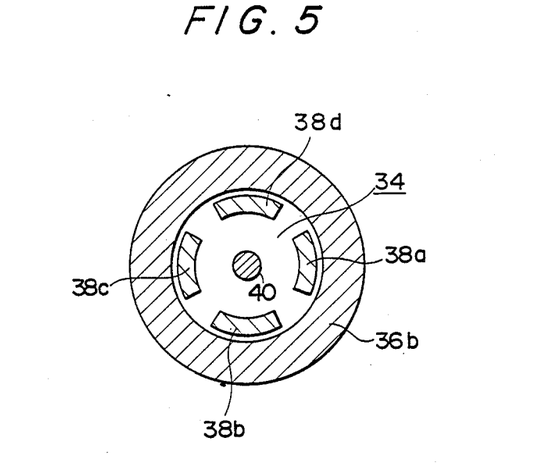
FIG. 5 is a cross-sectional view of the system of FIG. 3 along a line V—V.
Figure 6:
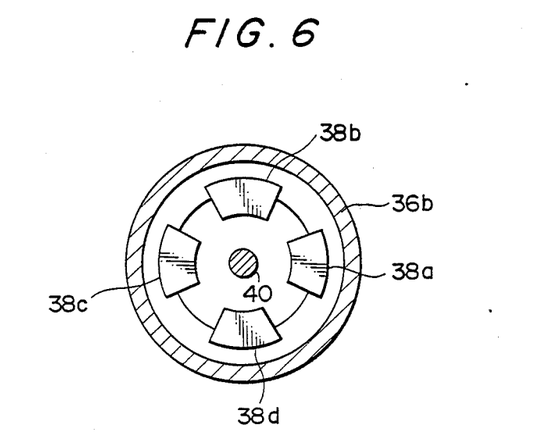
FIG. 6 is a cross-sectional view of the system of FIG. 3 along a line VI—VI.

FIGS. 5 and 6 respectively show cross-sectional views along lines V—V and VI—VI of FIG. 3. As can be seen from FIGS. 3, 5, and 6, on the upper surface of the body 10, there is arranged a support plate 36 having a circular opening 34, which comprises a support section 36a and an annular rail section 36b disposed in association therewith as shown in these figures. The annular rail section 36b pivotally supports a leg portion 38 arranged on a bottom surface of the housing 16.

The leg portion 38 includes four leg members 38a, 38b, 38c, and 38d located on a circumference in the bottom surface of the body 10, and the respective leg members are pivotally attached onto the annular rail section 36 so as to be rotably supported by the annular rail section 36b. Each leg member has substantially a ] shape such that the annular rail section 36b is mounted in a depressed portion thereof. The leg portion 38 is not limited to this structure including the four leg members 38a, 38b, 38c, and 38d. The leg portion 38 may be constituted with an arbitrary number of leg members. Alternatively, there may be provided a member of a cylindrical shape having a depressed portion in which the annular rail section 36b is to be installed.

In a lower section of the housing 16, there is disposed an opening. As shown in FIG. 2, a code 40 including a signal line from the light receiver 12 and one from the tally light emitting diode 14 is passed through this hole, the inside of the four leg members 38a, 38b, 38c, and 38d, and the opening 34 of the annular rail section 36b so as to establish predetermined connectins with circuits in the body 10.

Figure 7:
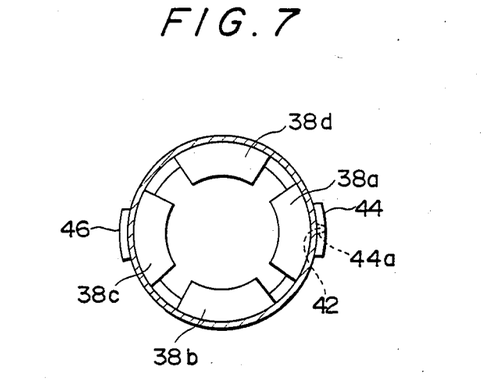
FIG. 7 is a cross-sectional view of the system of FIG. 3 along a line VII—VII.

FIG. 7 shows a cross-sectional view along a line VII—VII of FIG. 3. As shown in this figure, there is disposed a projection 42 in an outer peripheral portion of the leg member 38a located on the right-hand side in the state of FIG. 3. On the other hand, the plate 36 is provided with an engaging member 44 and a rotation stopper member 46, respectively, at opposing positions on the circumference. The engaging member 44 includes a depressed portion 44a in an inner side thereof such that when the projection 42 is engaged with the depression 44a, a rotary movement of the leg portion 38 is prevented so that the light receiver 12 and the tally lamp 14 mounted in the housing 16 face the front side with respect to the body 10. The engaging member 44 is arranged not to prevent the rotary movement of the leg portion 38 such that there exists a space or gap between the leg portion 38 and engaging member 44, so that the projection 42, disposed on the outer periphery of the leg member 38a, slides through the space.

When the end portion of the rotation stopper member 46 is brought into contact with the projection 42 disposed in the outer periphery of the leg member 38a, the rotation of the leg member 38 is prevented, namely, the light receiver 12 and the tally lamp 14 mounted in the housing 16 are prevented from facing the rear side with respect to the video camera body. In consequence, the leg prtion 38 and the housing 16 do not rotate by an angle more than 360 degrees in a direction, and hence the code 40, including the signal lines respectively from the tally lamp 14 and the light receiver 12, is not twisted.

As described above, the plate 36 fixedly disposed on the body 10 is employed to rotatably support the leg portion 38 supporting the housing 16. In consequence, in a case where the apparatus undergoes a remote control operation, the video camera body 10 is beforehand located to face in a direction toward an object and the housing 16 and the leg portion 38 are rotated with respect to the support plate 16 so as to effect an adjustment to face the light receiver 12 and the tally lamp 14 in the direction of a position where the operator conducts a shooting operation. The housing 16 and the leg portion 38 are rotated, for example, manually by the operator grasping the housing 16 by hand. Since the leg portion 38 disposed in the housing 16 is rotably supported on the annular rail section 36b of the plate 36, when the housing 16 is rotated by hand, the leg members 38a, 38b, 38c, and 38d of the leg portion 38 travel on the annular rail section 36b.

As described above, after directing the light receiver 12 and the tally lamp 14 in the direction of operation, the operator conducts an ordinary remote control operation by use of a remote control light emitter, not shown, from the position, which causes the camera to achieve a shooting operation. Since the light receiver 12 and the tally lamp 14 face the operator, the infrared ray emitted from the light emitter enters the light receiving section 12 without failure, and then an electric signal from the light receiver 12 is sent to predetermined circuits of the camera body 10, which thereby starts a shooting operation. In this situation, the tally lamp 14 also faces in the direction of the operator, and hence, it is possible for the operator, for example, in a standby state to see light from the green lamp and in a shooting operation state to see light from the red lamp from the position thereof, thereby confirming the state of the camera.

According to the embodiment above, the light receiver 12 and the tally lamp 14 can be moved to face in the direction toward a position where the operator conducts an operation. In consequence, it is possible for the operator to cause the infrared ray emitted in response to a remote control operation to enter into the light receiver 12 from various directions such as those associated with the front side, the rear side, and the side face of the camera and to confirm the operation of the camera by visually checking the tally lamp 14.

Incidentally, since the angle θ1 allowed for a light incident to the receiver 12 and the angle θ2 in which the light emitted from the tally lamp 14 is visible are limited to predetermined ranges, respectively, the operation can be achieved even when the directions of the light receiver 12 and the tally lamp 14 are not strictly matched with the direction in which the operator effects an operation.

Figure 8:
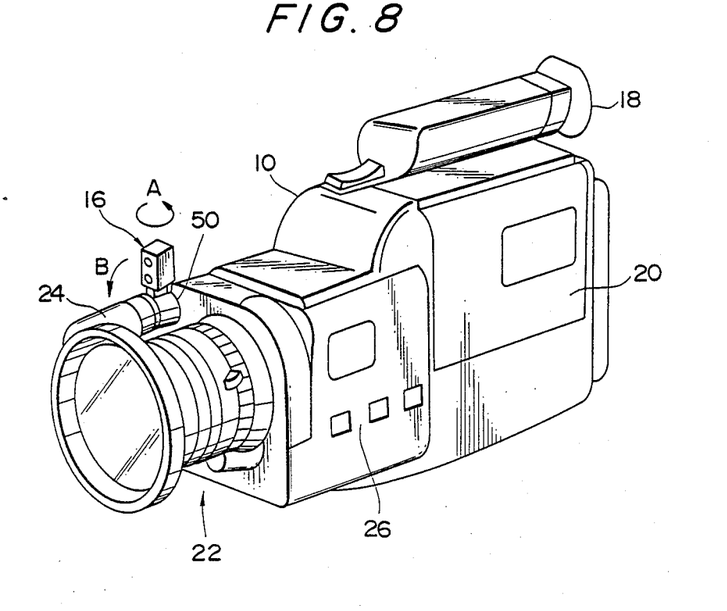
FIG. 8 is a perspective view showing an alternative embodiment of a VTR with a video camera integrated therewith according to the present invention.
Figure 9:
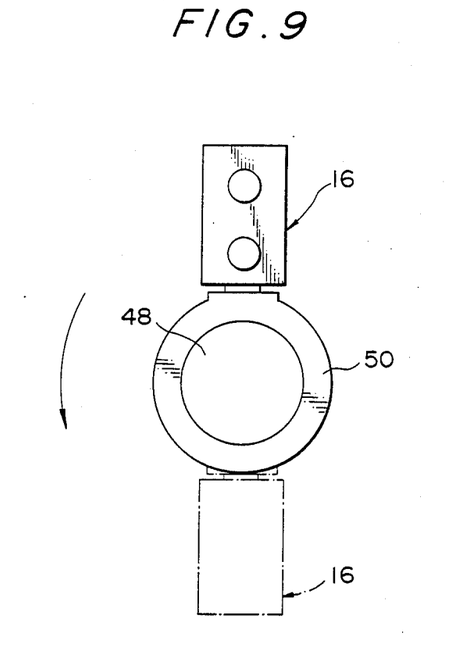
FIG. 9 is a front view showing only a microphone support section and a housing section of the system of FIG. 8.

FIGS. 8 and 9 show an alternative embodiment according to the present invention.

In this system, a housing 16 to install therein a tally lamp 14 and a light receiver 12 are rotably supported on an annular section 50 attached to a periphery of a support section 48 (FIG. 9) employed to mount a microphone 24 on the body 10. The housing 16 is rotably supported by a configuration similar to the configuration of the embodiment above such that the housing 16 is rotable in a direction indicated by an arrow A with respect to a body 10 by means of a support plate 36 including an annular rail section 36b and that the plate 36 is rotable in a direction indicated by an arrow B around the support section 48. As a result, the housing 16 is also rotated in the direction of the arrow B around the support section 48. The plate 36 is provided, as shown in FIG. 9, as an annular section 50 rotably mounted on a periphery of the support section 48 such that when the annular section 50 rotates on the periphery of the support section 48, the housing 16 is rotated around the support section 48.

In a case of this apparatus, like in the case of the embodiment above, the light receiver 12 and the tally lamp 14 are rotated in the direction of the arrow A during a remote control operation so as to face the direction of the operator; whereas, in a case where the remote control operation is not effected, the housing 16 is rotated in the direction of the arrow B so as to be located at a position below the support section 48 of the microphone 24. As a result, when the light receive section 12 and the tally lamp 14 are not used, these components are arranged not to disturb the operation.

Figure 10:
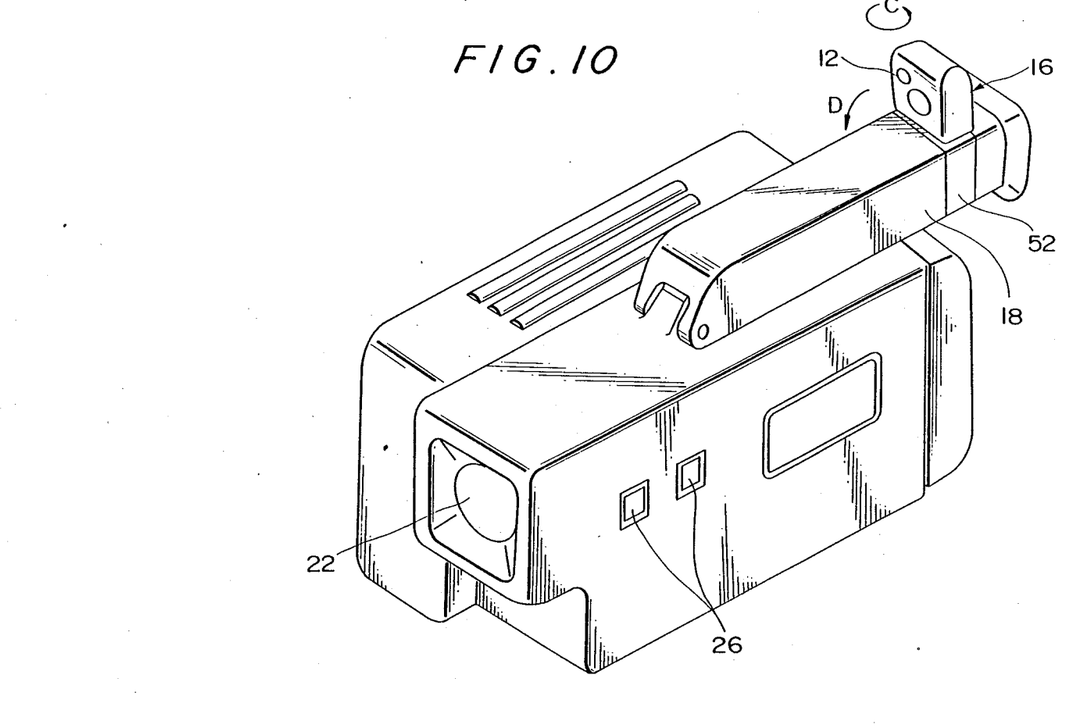
FIG. 10 is a perspective view showing still an alternative embodiment of a VTR with a video camera integrated therewith according to the present invention.
Figure 11:
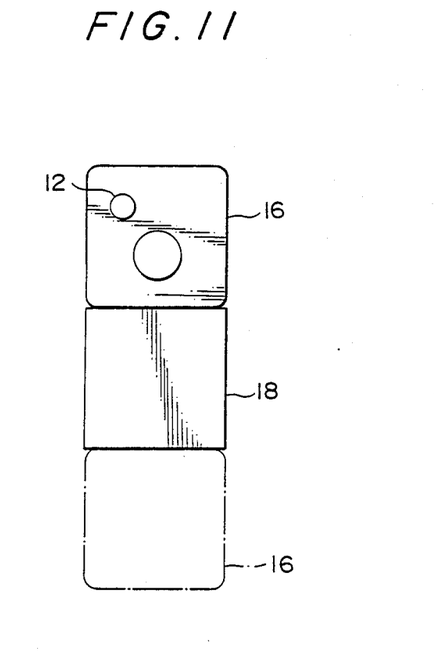
FIG. 11 is a front view showing an electronic viewfinder and a housing section of the system of FIG. 10.

FIGS. 10 and 11 show still an alternative embodiment according to the present invention.

In this system, a housing 16 in which a tally lamp 14 and a light receiver 12 are mounted is rotably installed on an electronic viewfinder 18. In this system, like in the embodiment of FIG. 8, there is disposed an annular section 52 rotably mounted on a periphery of the electronic viewfinder 18 such that when the annular section 52 rotates around the viewfinder 18, the housing 16 is rotated around the viewfinder 18. As a result, the tally lamp 14 and the light receiver 12 are rotable in a direction of an arrow C with respect to the body and are also rotable around the electronic viewfinder 18 in the direction of an arrow D.

Also, in this case, the tally lamp 14 and the light receiver 12 are rotated in a remote control operation to face the direction of the operator, and in a case where the remote control operation is not effected, the housing 16 is rotated in the direction of the arrow D so as to be located at a position below the electronic viewfinder 18. In consequence, when the tally lamp 14 and the light receiver 12 are not used, it is possible to prevent these components from disturbing the operation.

In the embodiment above, although the tally lamp 14 and the light receiver 12 are installed in the same housing 16 so as to face a direction such that the the tally lamp 14 and the light receiver 12 are simultaneously rotated in a direction by rotating the housing 16 with respect to the body 10, the present invention is not limited by this system, namely, it is also possible to separately rotate the light receiver 12 and the tally lamp 14 with respect to the body so as to direct the light receiver 12 and the tally lamp 14 toward the different directions, respectively. In this case, in order to enable the operator to confirm the state of the camera in the remote control operation, it is necessary to set the difference between the angle of the light receiver 12 and that of the tally lamp 14 to be less than the smaller one selected from the angles θ1 and θ2.

According to the present invention, since the video camera is provided with light receiver means and display means, the remote control operation is accomplished by receiving a light by use of the light receiver means. In this operation, the operator can recognize the state of the video camera by visually checking the display means so as to effect an appropriate remote control operation. In addition, since the directions respectively of the light receives means and the display means can be varied depending on the operation in which the operator effects the operation, it is possible for the operator to efficiently carry out the remote control operation from various directions.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video camera capable of effecting a remote control operation comprising:
   light receiving means for a remote control;
   display means for displaying in a remote control operation a state of an operation of said camera to an operator;
   means for rotating said light receiving means and said display means at least in a horizontal direction with respect to a body of said camera; said
   direction, respectively, of said light receiving means and said display means being capable of being varied depending on a direction in which an operator effects operation.

2. A video camera in accordance with claim 1, wherein said rotating means is further capable of rotating said light receiving means and said display means also in a vertical direction with respect to the body of said camera.

3. A video camera in accordance with claim 2, wherein
   said camera further includes a section on which a microphone is to be mounted; and
   said rotating means is rotatably mounted on said section.

4. A video camera in accordance with claim 2, wherein
   said camera further includes a viewfinder mounted on the body of said camera; and
   said rotating means is rotably mounted on said viewfinder.

5. A video camera in accordance with claim 1, wherein said display means is a tally lamp.

6. A video camera in accordance with claim 5, wherein
   said camera further includes a housing to install therein said light receiving means and said tally lamp; and
   said rotating means includes leg members arranged in a circumferential form in a lower portion of said housing and a rail member disposed in an upper portion of the body of said camera such that when said leg members travel on said rail member, said housing is rotated in a horizontal direction with respect to said camera.

7. A video camera in accordance with claim 6, wherein said leg members include projections and said rail member possesses an engaging section such that when said projections engage with said engaging section, rotation of said housing is limited to a predetermined range.

8. A video camera in accordance with claim 5, wherein an angle $\theta 1$ of light incident to said light receiving means and an angle $\theta 2$ of light emitted from said tally lamp are limited to satisfy a relationship of $\theta 1 \geqq \theta 2$.

* * * * *